UNITED STATES PATENT OFFICE.

CHARLES ALFRED CARLES DE CAUDEMBERG, OF NICE, FRANCE.

COMPOSITION OF MATTER FOR PAVING ROADS.

SPECIFICATION forming part of Letters Patent No. 656,094, dated August 14, 1900.

Application filed February 23, 1900. Serial No. 6,438. (No specimens.)

*To all whom it may concern:*

Be it known that I, CHARLES ALFRED CARLES DE CAUDEMBERG, doctor of medicine, a citizen of the Republic of France, residing at 43 Rue Cotta, Nice, (Alpes Maritimes,) France, have invented certain new and useful Improvements in a New Composition of Matter more Especially Adapted for Use in Paving Roads, Footways, and the Like, of which the following is a specification.

This invention, for which I have obtained Letters Patent in France, dated the 12th day of August, 1899, and numbered 291,545, has for its object a new composition of matter more especially adapted for use in paving roads, footways, lining terraces, cellars, yards, stables, and the like.

The new composition, which consists of a preparation of bituminous matter and rubber or caoutchouc, has been obtained according to the following observations: I have found that bitumen, which enters into the composition of asphalt, will under suitable conditions intimately combine with rubber or caoutchouc and form a homogeneous elastic black material especially suitable for the purposes mentioned. The india-rubber is dissolved in a solvent therefor—such, for example, as spirits of turpentine or petroleum spirit or the like. The rubber usually dissolves in about twelve to forty-eight hours, according to the temperature. The fine-powdered asphalt is then impregnated with the solution. The quantity of rubber varies from ten to twenty grains per liter of spirit. The quantity of spirit may vary from four to eight liters per one hundred kilograms of powdered asphalt. These above-mentioned proportions are the more frequently employed. They may together be varied in suitable limits, according to the nature of the work to be performed or to the temperature and the quantity of bitumen contained in the asphalt. The spirit in which the rubber is dissolved acts upon the bitumen contained in the asphalt, softening and dissolving it, and thus diffusing the rubber throughout the mass. The ingredients should be mixed very thoroughly together, and in order to insure a satisfactory result the mass is preferably allowed to stand for about half an hour before being used. Other means for softening the rubber and bitumen, allowing a complete mixing of the ingredients, and particularly the melting, may be used. The employment of spirits in a cold state is at the same time more convenient and economical. The asphalt thus prepared can then be spread in a uniform layer upon a bed of lime concrete or well-dried cement and compressed by ramming. When the layer has set, it is rolled with a roller, say, from two hundred to three hundred kilograms in weight, and before the surface is used for traffic it is advisable to again roll it with a roller weighing, say, from two thousand to three thousand kilograms. If this layer, prepared as above described, be cut with a sharp blade, the several parts present a gray, nacreous, and glossy surface. The asphalt consists of molecules of carbonate of lime incased in bitumen. The rubber combining therewith forms a thin film surrounding each of the molecules and adds to their adhesiveness and elasticity.

The valuable qualities of ordinary asphalt are well known. They are damp-proof, hygienic, of good appearance, soft to ride on, free from mud or dust, and very durable. These qualities are all increased by the presence of rubber.

Owing to the presence of the rubber, the asphalt, in accordance with this invention, is more elastic, and the ease experienced in riding thereon is unequaled. Also it never cracks and is therefore less liable to deterioration than is ordinary asphalt paving. It does not soften so readily and is less slippery than rubber itself. It firmly adheres to the concrete or materials with which it comes in contact, so that any infiltration becomes impossible.

Fresh material is very readily combined with the old layers without the junction being noticeable. The repairs are therefore as easy to be made as new pavements.

Having now particularly described and ascertained the nature of my invention and in what manner the same is to be performed, I declare that what I claim is—

A new paving composition, comprising powdered asphalt intimately mixed with rubber dissolved in spirits, the rubber forming a thin film surrounding each of the molecules of asphalt and operating as a binder to bind the whole together in one homogeneous mass, substantially as and for the purpose specified.

In testimony whereof I have hereunto set my hand in presence of two subscribing witnesses.

CHARLES ALFRED CARLES DE CAUDEMBERG.

Witnesses:
 LOUIS PAULIN DECAU,
 EMILE CACHIARDY DE MONTFLEUR.